United States Patent
Yang et al.

(10) Patent No.: US 12,407,278 B2
(45) Date of Patent: Sep. 2, 2025

(54) METHOD OF DETECTING FORWARD AND REVERSE CONNECTION OF THREE-PHASE MOTOR AND SOLID-STATE MOTOR STARTER

(71) Applicant: Schneider Electric (China) Co., Ltd., Beijing (CN)

(72) Inventors: Qing Yang, Shanghai (CN); Ying Shi, Shanghai (CN); Xiaohang Chen, Shanghai (CN)

(73) Assignee: Schneider Electric (China) Co., Ltd., Beijing (CN)

( * ) Notice: Subject to any disclaimer, the term of this patent is extended or adjusted under 35 U.S.C. 154(b) by 170 days.

(21) Appl. No.: 18/519,560

(22) Filed: Nov. 27, 2023

(65) Prior Publication Data
US 2025/0088126 A1    Mar. 13, 2025

(30) Foreign Application Priority Data
Sep. 8, 2023 (CN) .......................... 202311160710.6

(51) Int. Cl.
*H02P 1/16* (2006.01)

(52) U.S. Cl.
CPC ..................................... *H02P 1/16* (2013.01)

(58) Field of Classification Search
CPC ........... F02N 2019/007; F02N 11/0859; F02N 2011/0896; F02N 11/10; H02P 1/022; H02P 1/16
See application file for complete search history.

(56) References Cited

U.S. PATENT DOCUMENTS

2004/0000281 A1*    1/2004   Wakitani ............... F02N 19/005
                                                            290/38 R

* cited by examiner

*Primary Examiner* — Antony M Paul
(74) *Attorney, Agent, or Firm* — Troutman Pepper Locke LLP (57) ABSTRACT

A method of detecting forward and reverse connection of a three-phase motor is disclosed, including: turning on a first solid-state switch pair and a second solid-state switch pair into conduction for a predetermined period of time so that current can flow between a power supply and the three-phase motor; detecting output current of a solid-state motor starter; and determining the forward and reverse connection state of the three-phase motor based on the output current of the solid-state motor starter, in a case that currents exist at a first output terminal and a second output terminal, it is determined that the three-phase motor is in the forward connection state, and in a case that currents exist at the first output terminal and a third output terminal, it is determined that the three-phase motor is in the reverse connection state. Furthermore, a solid-state motor starter is disclosed.

10 Claims, 4 Drawing Sheets

Fig. 6

METHOD OF DETECTING FORWARD AND REVERSE CONNECTION OF THREE-PHASE MOTOR AND SOLID-STATE MOTOR STARTER

CROSS-REFERENCE TO RELATED APPLICATIONS

This application claims the benefit of priority to China Application No. CN202311160710.6 filed Sep. 8, 2023 the content of which is incorporated by reference herein in its entirety.

TECHNICAL FIELD

The present disclosure relates to the field of forward and reverse connection detection of motors, particularly to a method of detecting forward and reverse connection of a three-phase motor and a solid-state motor starter.

BACKGROUND

The motor can be set to forward and reverse rotation as required during operation, such as for clockwise or counterclockwise rotation of a turntable, upward or downward movement of an elevator, etc. In the case that the motor is in a positive phase sequence, i.e., a forward connection state, the motor runs forward. In the case that the motor is in a reverse phase sequence, i.e., a negative connection state, the motor runs in the reverse direction.

Therefore, before the motor is normally powered up, it is necessary to know the forward and reverse connection state of the motor in advance, so as to determine whether the forward and reverse rotation of the motor meets the requirements after startup, so as to prevent the operation that does not meet the regulations after startup and sometimes even causes serious consequences.

There are currently two mainstream solutions on the market for detecting the forward and reverse connection of three-phase motors. The first solution is based on a control circuit that uses two interlocked contactors to realize the forward and reverse rotation of the motor by changing the wiring sequence, and the forward and reverse connection of the motor is determined by determining which of the two contactors is in on-state, in order to determine which contactor is in on-state, it is necessary to use a microswitch to indicate the contactor state or detect the contactor's auxiliary contact state, which requires the setting and detection of the microswitch or auxiliary contact, which increases the design difficulty and cost. The second solution is based on the use of a frequency converter to achieve forward and reverse rotation control of the motor. In the case of using a frequency converter, different output phase sequences are achieved by directly changing the control signal of the three-phase bridge arm conduction, so that the motor can run with the positive phase sequence or negative phase sequence.

SUMMARY

In order to achieve improved detection of forward and reverse connection of a three-phase motor, the present disclosure proposes a method of detecting forward and reverse connection of a three-phase motor and a solid-state motor starter that can perform the detection method, enabling pre-detection of forward and reverse connection of a three-phase motor in a simple and reliable manner with no additional design or cost. so that it can be detected in a simple and reliable manner without additional design and cost.

An embodiment of the present disclosure provides a method of detecting forward and reverse connection of a three-phase motor, wherein the three-phase motor is connected to a power supply through a solid-state motor starter. The solid-state motor starter comprises a solid-state switch module, a forward and reverse switch module, a first output terminal, a second output terminal and a third output terminal. The solid-state switch module is configured to turn on or off between the power supply and the three-phase motor, and comprises a first solid-state switch pair, a second solid-state switch pair and a third solid-state switch pair respectively corresponding to a first phase, a second phase and a third phase of the power supply. The forward and reverse switch module is configured to set the forward and reverse connection of the three-phase motor. The first output terminal, the second output terminal and the third output terminal are configured to connect a first motor terminal, a second motor terminal and a third motor terminal, respectively. The first solid-state switch pair is connected to the first output terminal, and the second solid-state switch pair and the third solid-state switch pair are connected to one of the second output terminal and the third output terminal, respectively, through the forward and reverse switch module.

The method of detecting comprises:
turning on the first solid-state switch pair and the second solid-state switch pair into conduction for a predetermined period of time so that current can flow between the power supply and the three-phase motor;
detecting output current of the solid-state motor starter; and
determining the forward and reverse connection state of the three-phase motor based on the output current of the solid-state motor starter.

In the case that currents exist at the first output terminal and the second output terminal, it is determined that the three-phase motor is in the forward connection state. In the case that currents exist at the first output terminal and the third output terminal, it is determined that the three-phase motor is in the reverse connection state.

According to an embodiment of the present disclosure, the output current of the solid-state motor starter is detected by a current detection unit. The current detection unit is arranged between the first solid-state switch pair and the first output terminal, between the forward and reverse switch module and the second output terminal, and between the forward and reverse switch module and the third output terminal. Or the current detection unit is arranged between the first output terminal and the first motor terminal, between the second output terminal and the second motor terminal, and between the third output terminal and the third motor terminal.

According to an embodiment of the present disclosure, the forward and reverse switch module comprises interlocked a first transfer switch and a second transfer switch, and wherein, in the case that the first transfer switch is turned on, the second solid-state switch pair is connected to the second output terminal and the third solid-state switch pair is connected to the third output terminal, in the case that the second transfer switch is turned on, the second solid-state switch pair is connected to the third output terminal and the third solid-state switch pair is connected to the second output terminal.

According to an embodiment of the present disclosure, the first transfer switch and the second transfer switch are mechanical transfer switches or solid-state transfer switches.

According to an embodiment of the present disclosure, the first solid-state switch pair, the second solid-state switch pair, and the third solid-state switch pair cach comprise solid-state switches connected in anti-series with anti-parallel diodes.

According to an embodiment of the present disclosure, the solid-state switches are MOS transistor switches or IGBT switches.

An embodiment of the present disclosure provides a solid-state motor starter connected between a power supply and a three-phase motor, comprising:
- a first input terminal, a second input terminal and a third input terminal, configured to connect to a first phase line, a second phase line and a third phase line of the power supply, respectively;
- a solid-state switch module, configured to turn on or off between the power supply and the three-phase motor, comprising a first solid-state switch pair, a second solid-state switch pair and a third solid-state switch pair connected to the first input terminal, the second input terminal and the third input terminal respectively;
- a forward and reverse connection switch module, configured to set the forward and reverse connection of the three-phase motor;
- a first output terminal, a second output terminal and a third output terminal, configured to connect the first motor terminal, the second motor terminal and the third motor terminal, respectively, wherein the first solid-state switch pair is connected to the first output terminal, the second solid-state switch pair and the third solid-state switch pair are connected to one of the second output terminal and the third output terminal, respectively, through the forward and reverse switch module;
- current detection unit for detecting the output current of the solid-state motor starter,
- a control unit, configured to turn on the first solid-state switch pair and the second solid-state switch pair into conduction for a predetermined period of time, so that current can flow between the power supply and the three-phase motor, and to determine the forward and reverse connection state of the three-phase motor based on the output current of the solid-state motor starter. In the case that currents exist at the first output terminal and the second output terminal, it is determined that the three-phase motor is in the forward connection state. In the case that currents exist at the first output terminal and the third output terminal, it is determined that the three-phase motor is in the reverse connection state.

According to an embodiment of the present disclosure, the current detection unit is arranged between the first solid-state switch pair and the first output terminal, between the forward and reverse switch module and the second output terminal, between the forward and reverse switch module and the third output terminal.

According to an embodiment of the present disclosure, the forward and reverse switch module comprises interlocked a first transfer switch and a second transfer switch, and wherein, in the case that the first transfer switch is turned on, the second solid-state switch pair is connected to the second output terminal and the third solid-state switch pair is connected to the third output terminal, in the case that the second transfer switch is turned on, the second solid-state switch pair is connected to the third output terminal and the third solid-state switch pair is connected to the second output terminal.

According to an embodiment of the present disclosure, the first solid-state switch pair, the second solid-state switch pair, and the third solid-state switch pair each comprise solid-state switches connected in anti-series with anti-parallel diodes.

An embodiment of the present disclosure provides a detection device for forward and reverse connection of a three-phase motor, the detection device comprising: at least one processor; and at least one memory on which computer executable program is stored, which when executed by the processor is configured to perform the method according to one of the embodiments of the present disclosure.

An embodiment of the present disclosure provides a computer-readable storage medium on which computer-executable commands are stored, which when executed by a processor are configured to implement the method according to one of the embodiments of the present disclosure.

An embodiment of the present disclosure provides a computer program product or computer program comprising computer commands stored in a computer-readable storage medium. A processor of the computer device reads the computer commands from the computer-readable storage medium, and the processor executes the computer commands, so that the computer device performs a method according to an embodiment of the present disclosure.

BRIEF DESCRIPTION OF THE FIGURES

In order to illustrate the technical scheme of the embodiments of the present disclosure more clearly, the accompanying drawings required to be used in the description of the embodiments will be briefly described below. Obviously, the accompanying drawings in the description below are only exemplary embodiments of the present disclosure, and other accompanying drawings can be obtained according to these accompanying drawings without creative work for persons having ordinary skill in the art.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

In the present specification and the accompanying drawings, substantially same or similar steps and elements are represented by the same or similar reference numerals, and repeated descriptions of these steps and elements will be omitted. Meanwhile, the terms "first," "second," etc., which are used in the description and the claims of the present application for disclosure, are not intended to indicate any sequence, amount or importance, but for distinguishing various components.

Unless otherwise defined, all technical and scientific terms used herein have the same meanings as commonly understood by those skilled in the art of the present disclosure. The terms used herein are only for the purpose of describing the embodiments of the disclosure and are not intended to limit the disclosure.

Figure 1:
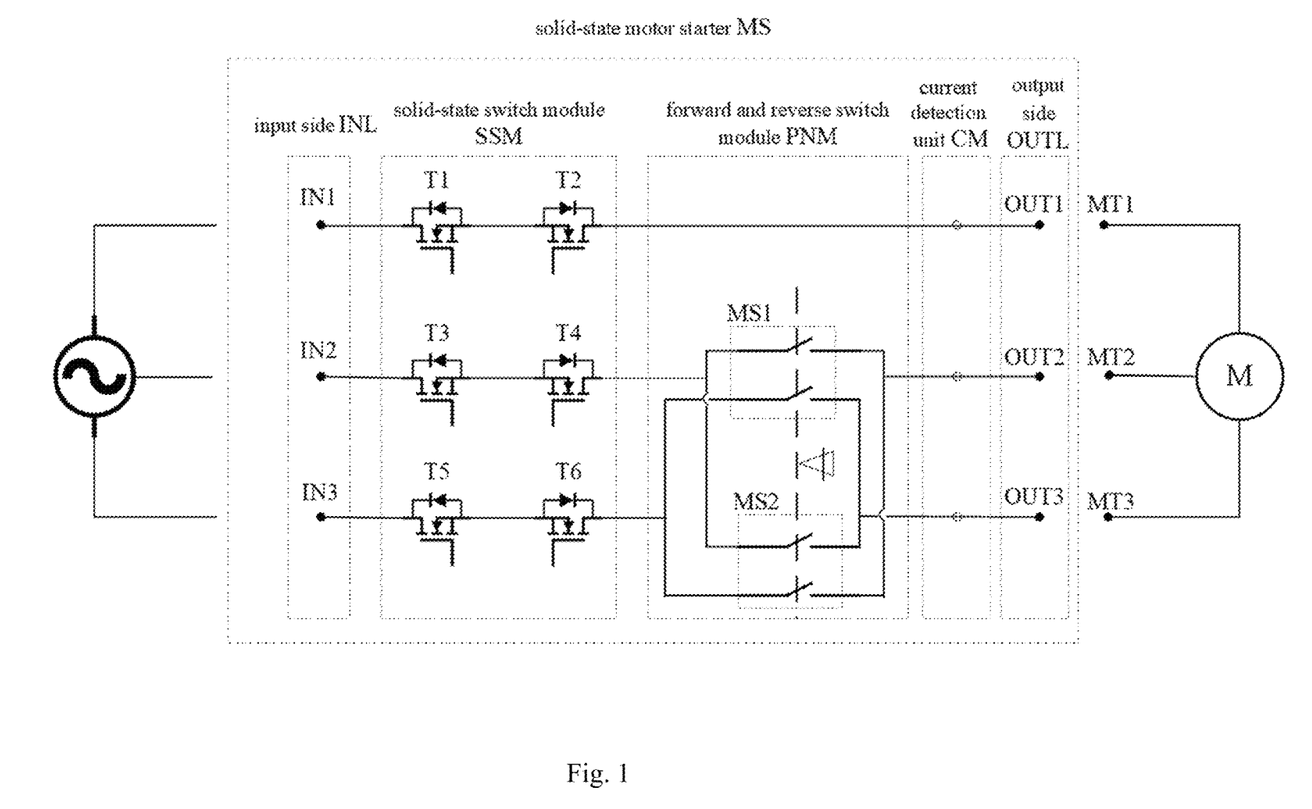
FIG. 1 illustrates a schematic diagram of a solid-state motor starter according to an embodiment of the present disclosure.

FIG. 1 illustrates a schematic diagram of a solid-state motor starter according to an embodiment of the present disclosure.

As shown in FIG. 1, the solid-state motor starter MS is connected between a power supply and a three-phase motor M, comprising an input side INL connected to the power supply, an output side OUTL connected to the three-phase motor M, and a solid-state switch module SSM and a forward and reverse switch module PNM, a current detection unit CM and a control unit (not shown) connected between the input side INL and the output side OUTL.

The input side INL comprises, for example, a first input terminal IN1, a second input terminal IN2, and a third input terminal IN3, which are respectively configured to connect the first phase line, the second phase line, and the third phase line of the power supply.

The output side OUTL comprises, for example, a first output terminal OUT1, a second output terminal OUT2 and a third output terminal OUT3, which are respectively configured to connect the first motor terminal MTI, the second motor terminal MT2 and the third motor terminal MT3 of the three-phase motor.

The solid-state switch module SSM is provided for switching on or off between the power supply and the three-phase motor M. The solid-state switch module SSM comprises, for example, a first, second and third solid-state switch pair connected to the first input terminal IN1, the second input terminal IN2 and the third input terminal IN3 respectively.

Preferably, as shown in FIG. 1, the first solid-state switch pair, the second solid-state switch pair and the third solid-state switch pair can respectively comprise, for example, anti-series connected solid-state switches with anti-parallel diodes. Specifically, the first solid-state switch pair comprises a first solid-state switch T1 and a second solid-state switch T2. The second solid-state switch pair comprises a third solid-state switch T3 and a fourth solid-state switch T4. The third solid-state switch pair comprises a fifth solid-state switch T5 and a sixth solid-state switch. Switch T6.

Preferably, the solid-state switch can be, for example, a MOS (Metal Oxide Semiconductor Field Effect Transistor) switch or an IGBT (Insulated Gate Bipolar Transistor) switch.

The forward and reverse connection switch module PNM is configured to set the forward and reverse connection of the three-phase motor M.

Preferably, the forward and reverse switch module PNM can comprise interlocked a first transfer switch and a second transfer switch. In the case that the first transfer switch is turned on, the second transfer switch is turned off, and in the case that the second transfer switch is turned on, the first transfer switch is turned off. Therefore, in the case that the first transfer switch is turned on, the second solid-state switch pair is connected to the second output terminal and the third solid-state switch pair is connected to the third output terminal. In the case that the second transfer switch is turned on, the second solid-state switch pair is connected to the third output terminal and the third solid-state switch pair is connected to the second output terminal.

The transfer switch can be, for example, a mechanical transfer switch or a solid-state transfer switch.

In FIG. 1, the forward and reverse switch module PNM comprises, for example, interlocked a first mechanical transfer switch MS1 and a second mechanical transfer switch MS2.

The first solid-state switch pair is directly connected to the first output terminal OUT1, and the second solid-state switch pair and the third solid-state switch pair are respectively connected to one of the second output terminal OUT2 and the third output terminal OUT3 through the forward and reverse switch module PNM. For example, in the case that the first mechanical transfer switch MS1 is closed, the second solid-state switch pair is connected to the second output terminal OUT2 and the third solid-state switch pair is connected to the third output terminal OUT3; in the case that the second mechanical transfer switch MS2 is closed, the second solid-state switch pair is connected to the third output terminal OUT3 and the third solid-state switch pair is connected to the second output terminal OUT2. Therefore, the on or close state of the mechanical transfer switch in the forward and reverse switch module PNM affects the connection line sequence between the phase lines of the power supply and the motor, thereby affecting the phase sequence of the motor.

The current detection unit CM is configured to detect the output current of the solid-state motor starter MS. For example, it can be arranged between the first solid-state switch pair and the first output terminal OUT1, between the forward and reverse switch module PNM and the second output terminal OUT2, between the forward and reverse switch module PNM and the third output terminal OUT3, so that the current at the first output terminal OUT1, the second output terminal OUT2 and the third output terminal OUT3 can be detected.

The control unit is configured to perform a method of detecting forward and reverse connection of a three-phase motor according to an embodiment of the present disclosure, for example, to turn on the first solid-state switch pair and the second solid-state switch pair into conduction for a predetermined period of time, so that current can flow between the power supply and the three-phase motor, and the forward and reverse connection state of the three-phase motor can be determined based on the output current of the solid-state motor starter. For example, the control unit can have a display device to display the current detection results and/or the three-phase motor forward and reverse connection determination results in an intuitive form to facilitate pre-detection operability.

With the current detection unit and the control unit integrated in the solid-state motor starter MS, external devices that need to be provided to realize functionality of the current detection unit and the control unit can be omitted, so that the solid-state motor starter according to the embodiment of the present disclosure can perform the method of detecting forward and reverse connection of the three-phase motor according to the embodiment of the present disclosure.

Figure 2:
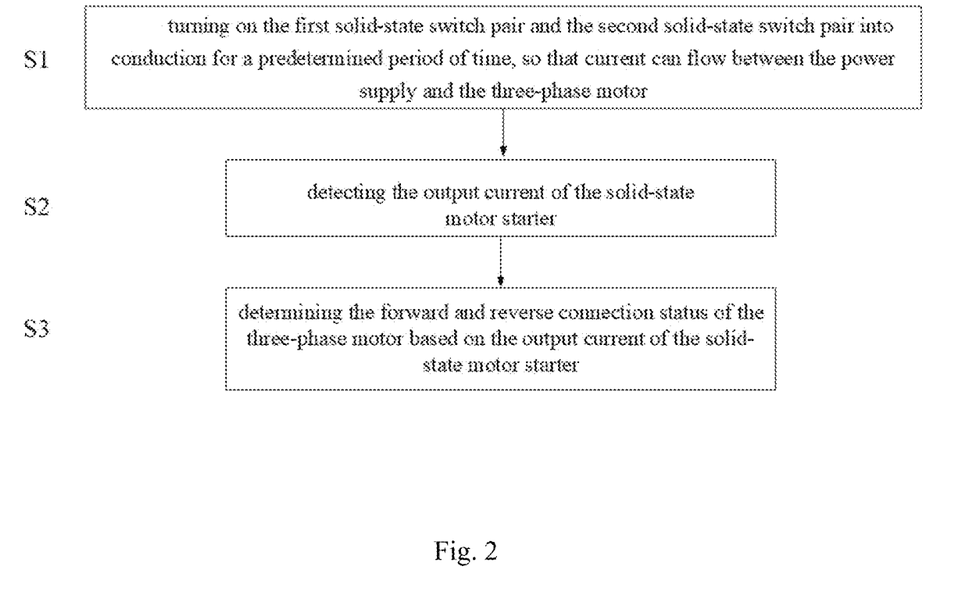
FIG. 2 illustrates a schematic flowchart of a method of detecting forward and reverse connection of a three-phase motor according to an embodiment of the present disclosure.
Figure 3A:
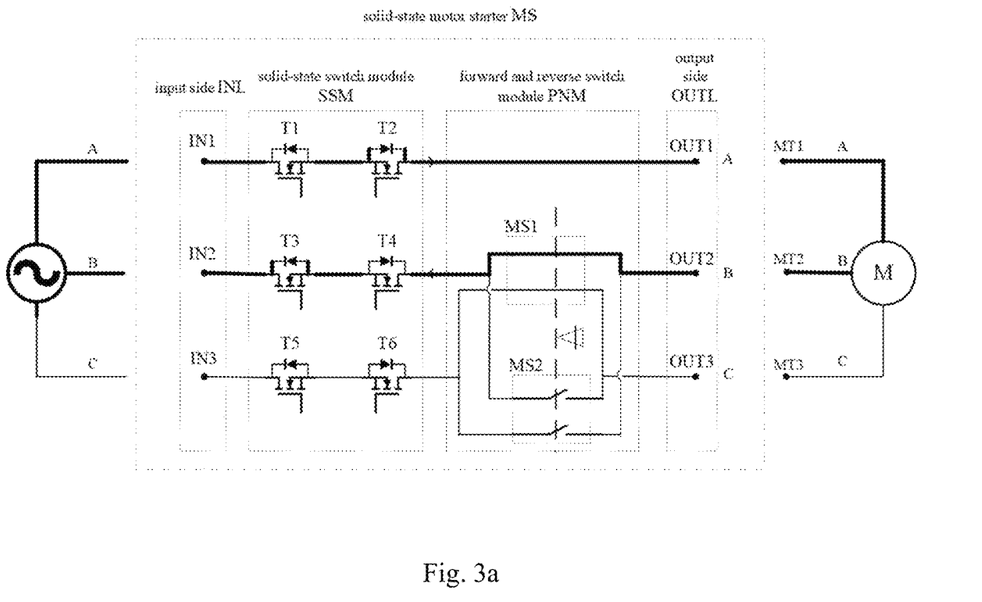
FIG. 3a illustrates a schematic circuit diagram of a three-phase motor with forward connection according to an embodiment of the present disclosure.
Figure 3B:
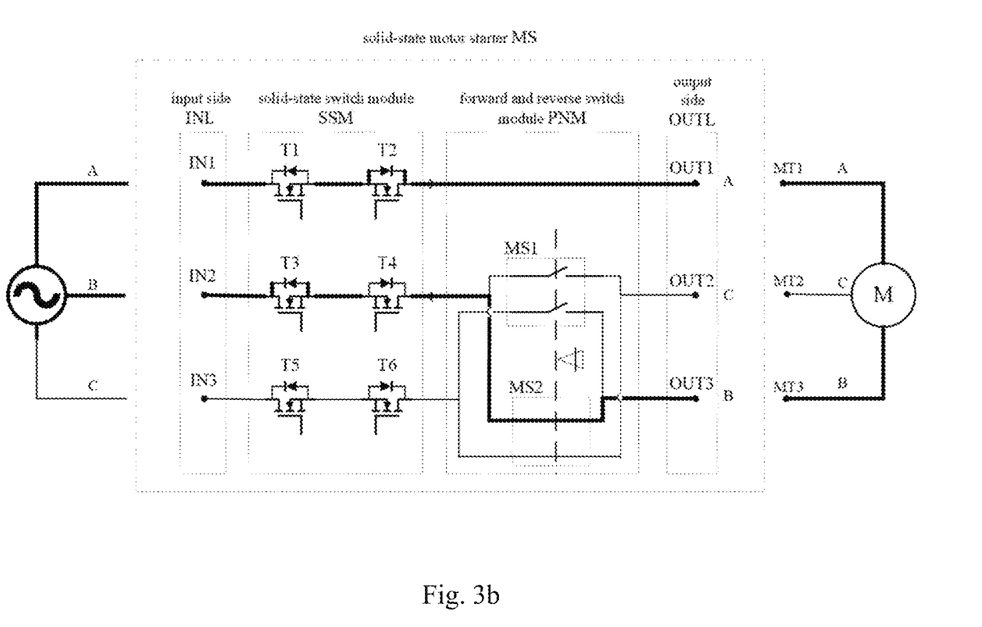
FIG. 3b illustrates a schematic circuit diagram of a three-phase motor with reverse connection according to an embodiment of the present disclosure.

The method of detecting forward and reverse connection of a three-phase motor according to an embodiment of the present disclosure will be described in detail below based on FIG. 2, FIG. 3a, and FIG. 3b. FIG. 2 illustrates a schematic flowchart of a method of detecting forward and reverse connection of a three-phase motor according to an embodiment of the present disclosure. FIG. 3a illustrates a schematic circuit diagram of a three-phase motor with forward connection according to an embodiment of the present disclosure. FIG. 3b illustrates a schematic circuit diagram of a three-phase motor with reverse connection according to an embodiment of the present disclosure.

For example, the method of detecting forward and reverse connection of a three-phase motor according to an embodiment of the present disclosure is performed on the basis of the solid-state motor starter according to FIG. 1 (except for the current detection unit and the control unit integrated therein).

As shown in FIG. 2, in the first step S1, turning on the first solid-state switch pair and the second solid-state switch pair into conduction for a predetermined period of time, so that current can flow between the power supply and the three-phase motor.

The predetermined time period is preferably an ms-level time period, such as between 1 ms and 20 ms, preferably 1 ms or 5 ms or 10 ms or 20 ms. Turning on the first solid-state switch pair and the second solid-state switch pair may be achieved, for example, by driving the first solid-state switch T1 and the fourth solid-state switch T4.

In the second step S2, detecting the output current of the solid-state motor starter.

According to an embodiment of the present disclosure, detecting the output current of the solid-state motor starter preferably comprises: detecting currents at the first output terminal, the second output terminal and the third output terminal, or detecting currents between the first output terminal, the second output terminal, the third output terminal and the three-phase motor. Therefore, current detection can be performed inside the solid-state motor starter, or between the solid-state motor starter and the three-phase motor, in order to determine whether a line sequence reversal has occurred within the solid-state motor starter and therefore affected the phase sequence of the three-phase motor.

For example, a current detection unit is configured to detect the output current of a solid-state motor starter. The current detection unit can be arranged between the first solid-state switch pair and the first output terminal, between the forward and reverse switch module and the second output terminal, between the forward and reverse switch module and the third output terminal, or can be arranged between the first output terminal and the first motor terminal, between the second output terminal and the second motor terminal, between the third terminal and the third motor terminal.

In the third step S3, determining the forward and reverse connection state of the three-phase motor based on the output current of the solid-state motor starter.

In FIG. 3a and FIG. 3b, the first phase line, the second phase line and the third phase line of the power supply output A phase, B phase and C phase respectively. The circuit which is conducting under the corresponding circumstances is shown as clearly bold lines. In the case that the corresponding motor terminals of the three-phase motor are connected according to the phase sequence of A phase-B phase-C phase, the three-phase motor is in the positive phase sequence and therefore in a forward connection state. In the case that the corresponding motor terminals are connected according to the phase sequence in which any two of the three phases have been reversed (for example, A phase-C phase-phase B), the three-phase motor is in negative phase sequence and therefore in a reverse connection state.

By driving the first solid-state switch T1 and the fourth solid-state switch T4 to turn on the first solid-state switch and the second solid-state switch into conduction, a loop is formed between the power supply and the three-phase motor, allowing current to flow.

In the case that the three-phase motor is connected forward, that is, in the case that the first motor terminal MT1, the second motor terminal MT2, and the third motor terminal MT3 of the three-phase motor M are connected in the phase sequence of A phase-B phase-C phase, as shown in FIG. 3a, the first output terminal OUT1 and the second output terminal OUT2 of the solid-state motor starter output current specifically in A phase and B phase respectively. The first phase line, the first solid-state switch pair, the first output terminal OUT, the first motor terminal MT1, the second motor terminal MT2, the second output terminal OUT2, the first mechanical transfer switch MS1, the second solid-state switch pair, the second phase line form a loop.

Therefore, according to the embodiment of the present disclosure, in the case that current exists at the first output terminal and the second output terminal, it is determined that the three-phase motor is in the forward connection state.

In the case that the three-phase motor is connected in reverse, that is, the first motor terminal MT1, the second motor terminal MT2, and the third motor terminal MT3 of the three-phase motor M are connected in the phase sequence of A phase-C phase-B phase, for example. In this case, as shown in FIG. 3b, the first output terminal OUT1 and the third output terminal OUT3 of the solid-state motor starter output current specifically in A phase and B phase respectively. The first phase line, the first solid-state switch pair, the first output terminal OUT, the first motor terminal MT1, the third motor terminal MT3, the third output terminal OUT3, the second mechanical transfer switch MS2, the second solid-state switch pair, the second phase line form a loop.

Therefore, according to the embodiment of the present disclosure, in the case that current exists at the first output terminal and the third output terminal, it is determined that the three-phase motor is in a reverse connection state.

With the method of detecting forward and reverse connection of a three-phase motor according to the embodiments of the present disclosure, it is not necessary to detect the closed or open state of the mechanical transfer switch in the forward and reverse switch module in advance, and additional components are omitted, the design is simplified and the cost is saved.

It should be understood that turning on the first pair of solid-state switches and the second pair of solid-state switches is exemplary only. Preferably, turning on the first solid-state switch pair and the third solid-state switch pair, for example, driving the first solid-state switch T1 and the sixth solid-state switch T6 can also achieve the technical effect of determining whether phase sequence reversal occurs, that is, determining the forward and reverse connection of the three-phase motor, and fall within the scope of this disclosure.

By pre-detecting the forward and reverse connection of the three-phase motor according to the embodiments of the present disclosure, it is ensured that the forward and reverse connection state of the motor meets the requirements before the motor is started normally, thus effectively avoiding misoperation.

Optionally, the method of detecting the forward and reverse connection of a three-phase motor according to the embodiments of the present disclosure can also monitor the rotation speed of the three-phase motor during the detection process to avoid undesired motor starting, thereby improving the safety of the detection method.

Optionally, in the method of detecting the forward and reverse connection of a three-phase motor according to an embodiment of the present disclosure, the detection of the output current on the starter side of the solid-state motor can also be extended to the detection of the input current on the side of the three-phase motor. Since the first output terminal, the second output terminal and the third output terminal of the solid-state motor starter are respectively connected to the first motor terminal, the second motor terminal and the third motor terminal of the three-phase motor, and therefore, a presence of a current at the first output terminal and the second output terminal is equivalent to a presence of a current at the first motor terminal and the second motor terminal, and a presence of a current at the first output terminal and the third output terminal is equivalent to a presence of a current at the first motor terminal and the third motor terminal, and the corresponding determination about the forward and reverse connection of the three-phase motor can be made according to the detection method. However, in the case that current exists at the first motor terminal, the second motor terminal and the third motor terminal at the same time, it can be additionally determined that there may be a wiring error on the three-phase motor side, so as to alert the user.

Figure 4A:
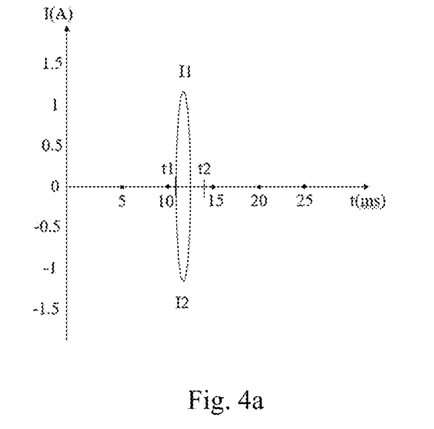
FIG. 4a and FIG. 4b illustrate schematic diagrams of simulation results of a method of detecting forward and reverse connection of a three-phase motor according to an embodiment of the present disclosure.
Figure 4B:
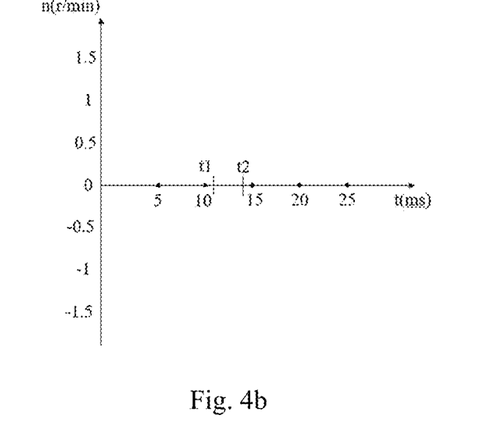

FIG. 4a and FIG. 4b illustrate schematic diagrams of simulation results of a method of detecting forward and reverse connection of a three-phase motor according to an embodiment of the present disclosure.

A diagram of the simulation results of the output current at the first, second and third output terminals of the solid-state motor starter is exemplarily shown in FIG. 4a. The horizontal axis represents time t in ms, and the vertical axis represents the current I in A.

The first solid-state switch pair and the second solid-state switch pair are turned on from time point t1 to time point t2. Time point t1 is, for example, the 11th ms, and time point t2 is, for example, the 14th ms. Therefore, the predetermined time period between time point t1 and time point t2 is 3 ms. As the first solid-state switch pair and the second solid-state switch pair are turned on, a current flows between the power supply and the three-phase motor, and currents I1, I2 are detected at the first output terminal and the second output terminal of the solid-state motor starter respectively, the currents I1 and I2 are approximately 1.2 A, and the current at the third output terminal is 0 A, that is, there is no current. Therefore, it can be determined that the three-phase motor is in the forward connection state. The accuracy of the detection method can also be verified by subsequently starting the motor.

It can be seen from the simulation results in FIG. 4a that the output current of the solid-state motor starter used for detection can be controlled at a smaller value, such as about 1.2 A, and the maintenance time of the output current is short, such as about 1 ms, which will not cause damage to the three-phase motor.

FIG. 4b exemplarily illustrates a schematic diagram of the simulation results of the three-phase motor speed during the detection process. The horizontal axis represents time t in ms, and the vertical axis represents the motor speed n in r/min (revolution/minute).

As shown in FIG. 4b, for example, the detection method according to the embodiment of the present disclosure is also performed between time point t1 and time point t2, and during this process, the rotation speed of the motor is consistently 0. And the detection method therefore advantageously avoids undesired rotation of the motor. By monitoring the motor speed, the safety and reliability of the detection method according to the embodiments of the present disclosure can also be improved.

Figure 5:
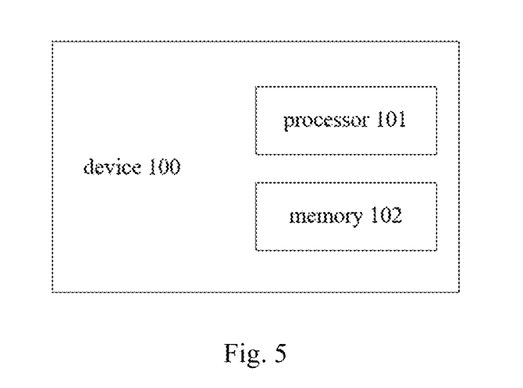
FIG. 5 illustrates a schematic diagram of a detection device for forward and reverse connection of a three-phase motor according to an embodiment of the present disclosure.

FIG. 5 illustrates a schematic diagram of a detection device for forward and reverse connection of a three-phase motor according to an embodiment of the present disclosure.

As shown in FIG. 5, the detection device 100 for the forward and reverse connection of a three-phase motor can comprise, for example, at least one processor 101 and at least one memory 102. An executable program is stored in the memory 102. In the case that the executable program is executed by the processor 101, the method of detecting according to the embodiment of the present disclosure is executed.

Figure 6:
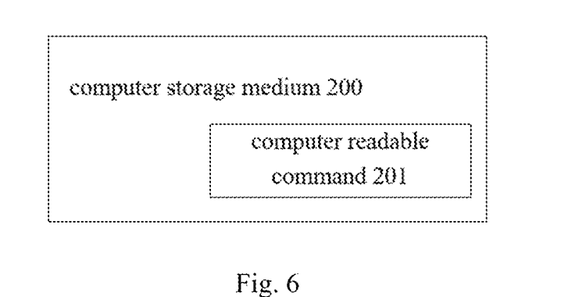
FIG. 6 illustrates a schematic diagram of a computer-readable storage medium according to an embodiment of the present disclosure.

FIG. 6 illustrates a schematic diagram of a computer-readable storage medium 200 according to an embodiment of the present disclosure.

As shown in FIG. 6, computer readable commands 201 are stored on the computer storage medium 200. In the case that the computer readable commands 201 are executed by a processor, the methods described with reference to the above described embodiments according to the present disclosure may be performed. Computer-readable storage medium in embodiments of the present disclosure may be volatile memory or non-volatile memory or may comprise both volatile and non-volatile memory. Nonvolatile memory can be read-only memory (ROM), programmable read-only memory (PROM), erasable programmable read-only memory (EPROM), electrically erasable programmable read-only memory (EEPROM), or flash memory. Volatile memory can be random access memory (RAM), which acts as an external cache. By way of illustration, but not limitation, plenty of forms of RAM are available, such as static random-access memory (SRAM), dynamic random-access memory (DRAM), synchronous dynamic random-access memory (SDRAM), double data rate synchronous dynamic random-access memory (DDRSDRAM), enhanced synchronous dynamic random-access memory (ESDRAM), synchronous linked dynamic random-access memory (SL-DRAM) and direct memory bus random access memory (DR RAM). It should be noted that memory for the methods described herein is intended to comprise, but is not limited to, these and any other suitable types of memory.

It should be noted that the flowcharts and block diagrams in the accompanying drawings illustrate the possible implementation architecture, functions and operations of systems, methods and computer program products according to various embodiments of the present disclosure. In this regard, each block in the flowchart or block diagrams may represent a module, segment, or portion of code that contains at least one executable command for implementing the specified logical function. It should also be noted that, in some alternative implementations, the functions noted in the block may occur out of the order noted in the figures. For example, two blocks shown one after another may actually execute substantially in parallel, or they may sometimes execute in the reverse order, depending on the functionality involved. It will also be noted that each block of the block diagram and/or flowchart illustration, and combinations of blocks in the block diagram and/or flowchart illustration, can be implemented with specialized purpose hardware-based systems that perform the specified functions or operations, or can be implemented with a combination of specialized hardware and computer commands.

In general, various example embodiments of the present disclosure can be implemented in hardware or specialized circuits, software, firmware, logic, or any combination thereof. Certain aspects can be implemented in hardware, while other aspects can be implemented in firmware or software that can be executed by a controller, a microprocessor or other computing device. When aspects of the embodiments of the present disclosure are illustrated or described as block diagrams, flowcharts, or are represented by other graphical representations, it will be understood that the blocks, apparatuses, systems, techniques, or methods described herein can be implemented in hardware, software, firmware, specialized circuits or logic, general-purpose hardware or controllers or other computing device, or some combination thereof, as non-limiting examples.

The exemplary embodiments of the present disclosure described in detail above are only illustrative and not limiting. It should be understood by those skilled in the art that various modifications and combinations can be made to these embodiments or the features without departing from the principles and the spirit of the present disclosure, and such modifications should fall within the scope of the present disclosure.

What is claimed is:

1. A method of detecting forward and reverse connection of a three-phase motor, wherein the three-phase motor is connected to a power supply through a solid-state motor starter comprising a solid-state switch module, a forward and reverse switch module, a first output terminal, a second output terminal and a third output terminal, the solid-state switch module is configured to turn on or off between the power supply and the three-phase motor and comprises a first solid-state switch pair, a second solid-state switch pair and a third solid-state switch pair respectively corresponding to a first phase, a second phase and a third phase of the power supply, the forward and reverse switch module is configured to set the forward and reverse connection of the three-phase motor, the first output terminal, the second output terminal and the third output terminal are respectively configured to connect a first motor terminal, a second motor terminal and a third motor terminal, respectively, the first solid-state switch pair is connected to the first output terminal, and the second solid-state switch pair and the third solid-state switch pair are connected to one of the second output terminal and the third output terminal, respectively, through the forward and reverse switch module,
wherein the method of detecting comprises:
turning on the first solid-state switch pair and the second solid-state switch pair into conduction for a predetermined period of time so that current can flow between the power supply and the three-phase motor;
detecting output current of the solid-state motor starter; and
determining the forward and reverse connection state of the three-phase motor based on the output current of the solid-state motor starter,
in a case that currents exist at the first output terminal and the second output terminal, it is determined that the three-phase motor is in the forward connection state, and in a case that currents exist at the first output terminal and the third output terminal, it is determined that the three-phase motor is in the reverse connection state.

2. The method according to claim 1, wherein the output current of the solid-state motor starter is detected by a current detection unit,
the current detection unit is arranged between the first solid-state switch pair and the first output terminal, between the forward and reverse switch module and the second output terminal, and between the forward and reverse switch module and the third output terminal, or
the current detection unit is arranged between the first output terminal and the first motor terminal, between the second output terminal and the second motor terminal, and between the third output terminal and the third motor terminal.

3. The method according to claim 1, wherein the forward and reverse switch module comprises interlocked a first transfer switch and a second transfer switch, and
wherein, in a case that the first transfer switch is turned on, the second solid-state switch pair is connected to the second output terminal and the third solid-state switch pair is connected to the third output terminal, in a case that the second transfer switch is turned on, the second solid-state switch pair is connected to the third output terminal and the third solid-state switch pair is connected to the second output terminal.

4. The method according to claim 3, wherein the first transfer switch and the second transfer switch are mechanical transfer switches or solid-state transfer switches.

5. The method according to claim 4, wherein the solid-state switches are MOS transistor switches or IGBT switches.

6. The method according to claim 1, wherein the first solid-state switch pair, the second solid-state switch pair, and the third solid-state switch pair each comprise solid-state switches connected in anti-series with anti-parallel diodes.

7. A solid-state motor starter connected between a power supply and a three-phase motor, comprising:
a first input terminal, a second input terminal and a third input terminal, configured to connect to a first phase line, a second phase line and a third phase line of the power supply, respectively;
a solid-state switch module, configured to turn on or off between the power supply and the three-phase motor, comprising a first solid-state switch pair, a second solid-state switch pair and a third solid-state switch pair connected to the first input terminal, the second input terminal and the third input terminal respectively;
a forward and reverse connection switch module, configured to set the forward and reverse connection of the three-phase motor;
a first output terminal, a second output terminal and a third output terminal, configured to connect the first motor terminal, the second motor terminal and the third motor terminal, respectively, wherein the first solid-state switch pair is connected to the first output terminal, the second solid-state switch pair and the third solid-state switch pair are connected to one of the second output terminal and the third output terminal, respectively, through the forward and reverse switch module;

a current detection unit for detecting the output current of the solid-state motor starter, and a control unit, configured to turn on the first solid-state switch pair and the second solid-state switch pair into conduction for a predetermined period of time, so that current can flow between the power supply and the three-phase motor, and to determine the forward and reverse connection state of the three-phase motor based on the output current of the solid-state motor starter, in a case that currents exist at the first output terminal and the second output terminal, it is determined that the three-phase motor is in the forward connection state, and in a case that currents exist at the first output terminal and the third output terminal, it is determined that the three-phase motor is in the reverse connection state.

8. The solid-state motor starter according to claim 7, wherein the current detection unit is arranged between the first solid-state switch pair and the first output terminal, between the forward and reverse switch module and the second output terminal, between the forward and reverse switch module and the third output terminal.

9. The solid-state motor starter according to claim 7, wherein the forward and reverse switch module comprises interlocked a first transfer switch and a second transfer switch, and wherein, in a case that the first transfer switch is turned on, the second solid-state switch pair is connected to the second output terminal and the third solid-state switch pair is connected to the third output terminal, in a case that the second transfer switch is turned on, the second solid-state switch pair is connected to the third output terminal and the third solid-state switch pair is connected to the second output terminal.

10. The solid-state motor starter according to claim 7, wherein the first solid-state switch pair, the second solid-state switch pair, and the third solid-state switch pair each comprise solid-state switches connected in anti-series with anti-parallel diodes.

* * * * *